Feb. 7, 1950     G. A. LEWIS     2,496,552
WATER LEVEL RECORDING DEVICE HAVING CLOCK
OPERATED STARTING MEANS
Filed June 7, 1945     2 Sheets-Sheet 1
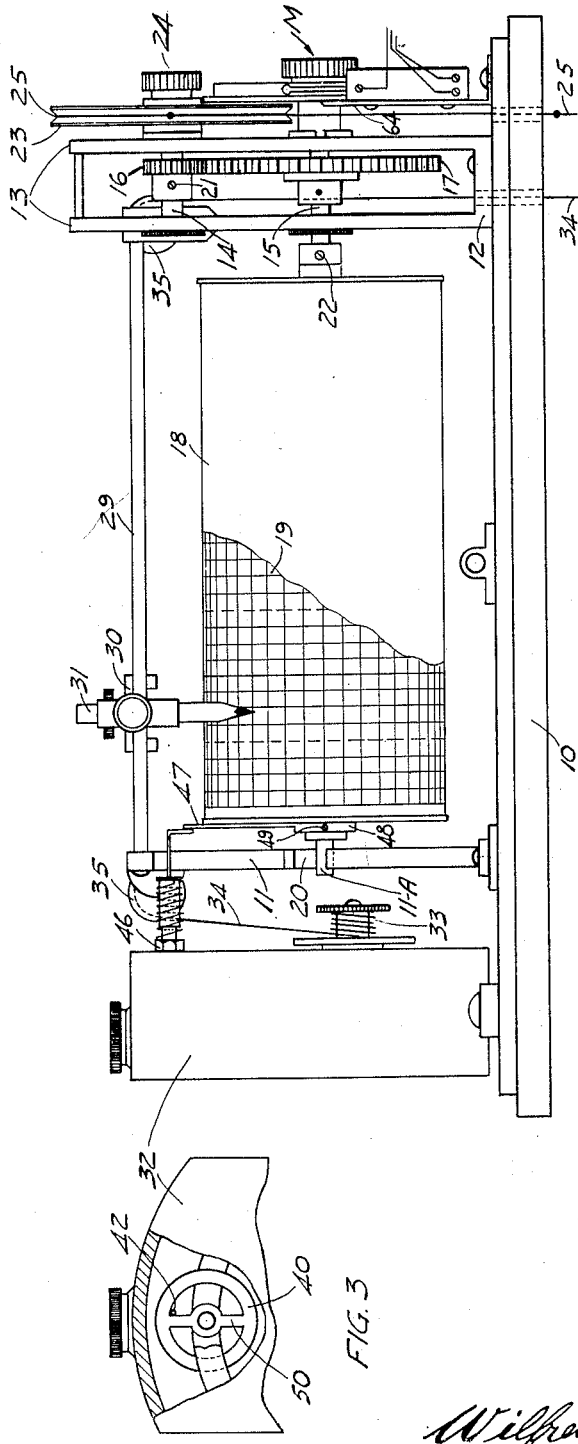
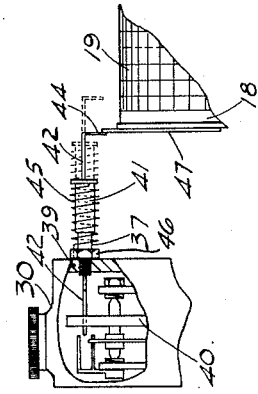
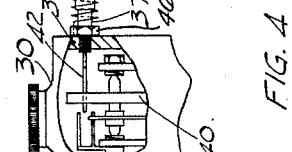
INVENTOR
Geo. A. Lewis
Wilfred E. Lawson
ATTORNEY Feb. 7, 1950           G. A. LEWIS          2,496,552
WATER LEVEL RECORDING DEVICE HAVING CLOCK
OPERATED STARTING MEANS
Filed June 7, 1945                   2 Sheets-Sheet 2
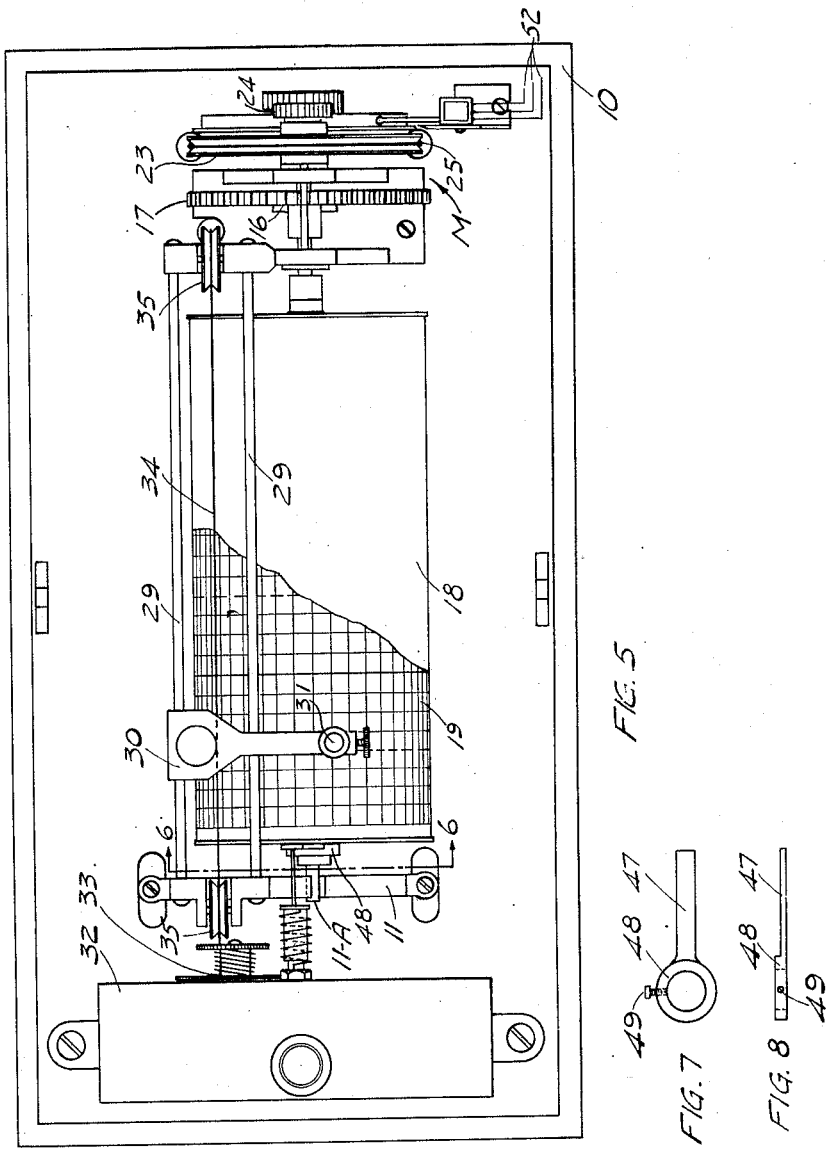
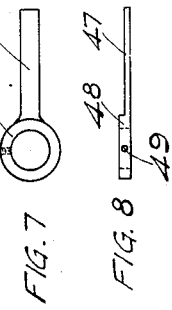
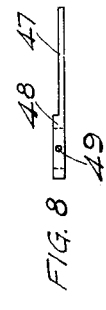
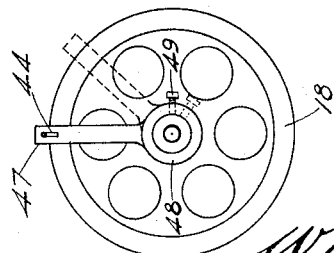

Patented Feb. 7, 1950

2,496,552

UNITED STATES PATENT OFFICE 2,496,552

WATER-LEVEL RECORDING DEVICE HAVING CLOCK OPERATED STARTING MEANS

George A. Lewis, Independence, Calif.

Application June 7, 1945, Serial No. 598,068

4 Claims. (Cl. 346—20)

This invention relates generally to the class of recording devices and pertains particularly to improvements in automatic starting for such devices or instruments.

The present invention has relation to recording instruments which are adapted to record the movement of a particular body over a certain period of time such, for example, as the varying level of a body of liquid or the like wherein there is employed in such recording instrument a clock, movable stylus, revolving drum upon which a record sheet is secured, gears and sheaves and a float. In the operation of such recording instruments the record sheet and the stylus have relative movement, one of such movements corresponding to lapse of time and the other movement corresponding to the movement of the body to be measured. In such instruments as at present employed the stylus movement is maintained regardless of whether the body to be measured, such as a body of water, is in movement or not and, therefore, regardless of whether the drum and record sheet are in motion. When such drum and record sheet are in motion then the stylus traces a graph upon the record sheet to show time lapse and also the degree of rise or fall of the liquid or other body being measured.

The invention has for one of its objects the provision of means for automatically starting the time controlling mechanism of a recording instrument of the character above described, concurrently with vertical movement of the liquid to be measured.

A still further object of the invention is to provide, in association with a rotary cylinder recorder and stylus, means carried by the cylinder for releasing the spring mechanism of a time control unit; for starting the rotation of the record sheet carrying drum simultaneously with the changing of the liquid level and for setting a signal control mechanism by means of which a desired signal can be given when the change in the elevation of the liquid surface has proceeded to a predetermined extent.

Other objects and advantages of the invention will become apparent as the description of the same proceeds and the invention will be best understood from a consideration of the following detailed description taken in connection with the accompanying drawings forming a part of the specification, with the understanding, however, that various changes and modifications may be made in the invention so long as such changes or modifications mark no material departure from the salient features of the invention as expressed in the appended claims.

In the drawings:

Figure 1 is a view in front elevation of a water stage recorder, showing the present invention applied thereto.

Figure 2 is a longitudinal sectional view, on an enlarged scale, of the clock mechanism control needle.

Figure 3 is a view partly in section and partly in elevation of a portion of the clock mechanism showing the manner in which the control needle is connected with the balance wheel.

Figure 4 is a view, partly in section, of a portion of the clock mechanism in association with a portion of the record sheet carrying drum, showing the balance wheel control needle and operating means therefor in side elevation.

Figure 5 is a view in top plan of the complete structure as illustrated in Figure 1, a portion only of the record sheet being shown on the cylinder.

Figure 6 is a sectional view on the line 6—6 of Figure 5 showing the end of the record drum in elevation and the needle pawl carried thereby.

Figure 7 is a view in plan of the needle pawl which is carried by the drum.

Figure 8 is a view in edge elevation of the pawl.

Referring now more particularly to the drawings the description will first be applied to the water stage recorder mechanism which is of general and known construction and in association with which the present invention is employed.

The recorder mechanism comprises a suitable supporting base 10 upon which is mounted the pair of standards 11 and 12. The standard 12 is in the form of a relatively long vertically disposed frame having the two spaced parallel bar portions 13 between which are supported the parallel upper and lower shafts 14 and 15 which carry respectively the small and large gears 16 and 17.

Disposed between the standards 11 and 12 is a drum or cylinder 18 around which is wrapped a graph or record sheet 19 to receive a combined time indicating and water movement record in the manner hereinafter described. This drum 18 is mounted upon the shaft 11—A as shown, and the end of the shaft remote from the gears is supported in a suitable bearing 20 forming a part of the standard 11.

Set screws 21 and 22, respectively securing the gear 16 and the drum 18 to their shafts allow for the making of initial adjustments of the mechanism as hereinafter described.

Upon the outer end of the shaft 14 there is mounted the sheave 23, which is secured to the shaft by the nut 24.

Passing around the sheave 23 is a cable 25 which passes down through the base 10 of the instrument and is connected at one end with a float (not shown) which rests upon the water, while the opposite end of the cable has a weight (not shown) attached thereto to counterbalance the float. It will be readily seen that as the water level rises and falls the float will be moved correspondingly and rotary motion will be given the sheave 23 which will be transmitted to the drum 18 through the gears.

Extending longitudinally of the instrument above the drum 18 and supported by and between the standards 11 and 12, is the pair of spaced parallel guide bars 29 upon which is supported for sliding movement, the runner body 30, which carries the marker or stylus 31, the point of which contacts the record sheet 19 upon the drum.

At the end of the drum opposite from the gear mechanism is the clock mechanism 32, with which is operatively coupled the chain spool 33 which is rotated by the clock mechanism when the latter is operating. Around the spool 33 is wound an end portion of the chain 34 which passes over suitable guide pulleys 35, located at opposite ends of the drum 18, thus extending lengthwise of the drum and between the guide bars 29. This chain is connected with the stylus runner 30 so that movement of the chain causes the stylus to be moved axially of the drum. The free end of the chain 34 is connected with an operating weight 36 whereby as the spool turns the chain unwinds therefrom and is caused to move in the proper direction to shift the stylus.

In accordance with the present invention means is provided for automatically starting the movement of the stylus for the recording of a time period on the record sheet, by the starting of the clock mechanism simultaneously with the starting of the drum rotation by movement of the float 26. This clock starting means comprises a tubular guide 37 which is threaded at one end as indicated at 38 for engagement in a suitable tapped opening 39 in the back wall of the casing of the clock mechanism adjacent to the clock balance wheel 40.

Slidable upon the tubular guide 37 is the sleeve 41 through which there extends the balance wheel holding and releasing needle 42 which also passes through the tubular guide and into the clock mechanism casing as shown in Figure 4. This needle 42 is secured to the sleeve 41 as indicated at 43 and at its outer end it has the down turned terminal finger 44.

Encircling the sleeve 41 and the tubular guide 37 is the expansion spring 45, the outer end of which bears against the head of the sleeve while the inner end is connected with the nut 46 which is threaded onto the guide and functions as a lock nut to secure the guide against movement after it has been attached to the back wall of the clock mechanism casing.

Cooperating with the finger 44 of the release needle, which finger functions as a trigger, is a pawl 47 which is formed integrally with a collar 48 which encircles and is secured to the hub of the drum 18 at the end adjacent to the clock mechanism, by the set screw 49. This pawl 47 is of sufficient length to extend beyond the periphery of the drum and into the path of movement of the trigger finger 44 when the needle 42 is shifted inwardly.

In order to set the clock release mechanism whereby to start the movement of the stylus 31 simultaneous with movement of the liquid surface, the sleeve 41 is shifted inwardly to compress the spring 45 and to move the free end of the release needle in to pass through the balance wheel 40 so that such free end of the needle may be positioned against a side of the spoke 50 of the balance wheel to hold the wheel under tension and against movement. At the same time the trigger finger 44 is shifted to a position where, when the needle is released, it will engage against the side of the pawl 47 and be held against further outward movement by the spring 45, without releasing the balance wheel 40.

When the level of the water body 27 changes, rotary movement will be imparted to the drum 18 to shift the pawl 47 and thus release the trigger finger 44. This permits the spring 45 to shift the release needle 42 away from connection with the clock mechanism balance wheel 40 thereby permitting the clock mechanism to start operating. This will permit the chain spool 33 to turn and cause the weight 36 to shift the chain so as to move the stylus 31 longitudinally of the drum and form on the record sheet a graph line indicating lapse of time. At the same time turning movement is given to the drum and record sheet by the movement of the cable 25 under the action of the float and balance weight so that the graph line formed on the record sheet will also designate the extent of rise or fall of the drum and accordingly of the water level during the recorded time period.

At the opposite end of the record carrying drum 18 from the clock mechanism there is positioned a depth indicating and signaling mechanism which is generally designated M and which is set forth and claimed in my copending application Serial No. 715,041, filed December 9, 1946.

I claim:

1. In a water level recording device of the type comprising two relatively movable parts upon one of which a record is made by the other and a clock mechanism adapted to move one of the parts; a reciprocable trigger adapted to hold said clock mechanism immobile, means for urging movement of the trigger to release the clock mechanism for operation, and a pawl carried by one of said parts and adapted to be positioned to maintain said trigger against movement during such time as the pawl carried part remains unmoved.

2. In a water level recording device of the type comprising two relatively movable parts upon one of which a record is made by the other and a clock mechanism adapted to move one of the parts; a reciprocable member adapted to have two positions and functioning when in one position to maintain said clock mechanism inoperative, means urging said member toward the second position where the clock mechanism is released for operation, and means carried by one of said parts and adapted when such one of said parts is stationary to maintain the reciprocable member in the said one position and to release the reciprocable member upon a predetermined movement of the said one of said parts.

3. In a water level recording device of the type comprising a rotatable cylinder designed to receive a record sheet, a stylus supported for movement longitudinally of the cylinder and a clock mechanism operatively coupled with the stylus to facilitate timed movement of the stylus relative to the record sheet; a pawl carried by the cylinder at one end and extending radially beyond the record sheet carrying surface of the cylinder, a spring actuated relatively long reciprocable member supported when moved to a predetermined position against the tension of the actuating spring to engage a portion of the clock mechanism to hold such mechanism against operation, said reciprocable member being adapted to engage against said pawl when moved to the said one position to be held in such position by the pawl until the pawl is shifted by and upon movement of the drum.

4. In a water level recording device of the type comprising a rotatably supported drum designed to receive a record sheet, a stylus adapted to move longitudinally of the drum, a spring clock mechanism operatively coupled with the stylus for regulating the movement of the stylus relative to the record sheet, the clock mechanism including a balance wheel; a guide adapted to be attached to the clock mechanism adjacent to the balance wheel, an elongated member slidably supported in the guide and adapted when moved in one direction to engage the balance wheel to maintain the latter against movement, means normally urging movement of the member in a direction to disengage it from the balance wheel, and a pawl carried by the drum to extend radially with respect to the drum, said pawl being adapted to be positioned in the line of movement of the elongated member to maintain such member against releasing movement relative to the balance wheel while said drum is stationary.

GEORGE A. LEWIS.

REFERENCES CITED

The following references are of record in the file of this patent:

UNITED STATES PATENTS

| Number | Name | Date |
|---|---|---|
| 995,414 | Nault | June 13, 1911 |
| 1,885,051 | Smulski | Oct. 25, 1932 |
| 1,967,157 | Thornton-Norris | July 17, 1934 |
| 2,215,542 | Chappell et al. | Sept. 24, 1940 |
| 2,216,035 | Lang | Sept. 24, 1940 |
| 2,238,983 | Parsons | Apr. 22, 1941 |